United States Patent [19]

Sugi et al.

[11] Patent Number: 4,928,524
[45] Date of Patent: May 29, 1990

[54] METHOD AND APPARATUS FOR MEASURING FLOW RATE OF A GAS CONTAINING CONDENSABLE COMPONENTS AND MISTS

[75] Inventors: Tokio Sugi; Yasuo Mori, both of Tokyo; Yugi Takahashi, Chigasaki, all of Japan

[73] Assignee: Tokyo Keiso Co., Ltd., Tokyo, Japan

[21] Appl. No.: 328,067

[22] Filed: Mar. 23, 1989

[30] Foreign Application Priority Data

Jul. 22, 1988 [JP] Japan .................................. 63-181644
Aug. 2, 1988 [JP] Japan ........................... 63-102054[U]

[51] Int. Cl.$^5$ .............................................. G01F 1/74
[52] U.S. Cl. ..................... 73/200; 73/118.1; 73/861.04
[58] Field of Search .................. 73/23, 29, 118.1, 200, 73/864.04

[56] References Cited

U.S. PATENT DOCUMENTS 4,468,962 9/1984 Keech et al. ........................... 73/200
4,739,647 4/1988 Monticelli, Jr. .................. 73/861.04

FOREIGN PATENT DOCUMENTS 1096114 12/1981 Japan .

Primary Examiner—Herbert Goldstein

[57] ABSTRACT

A method and an apparatus for measuring a flow rate of a gas such as a blow by gas in a reciprocating internal combustion engine in which condensable components and mists are contained are disclosed. The method for measuring the flow rate of the gas is characterized in that only after the condensable components and the mists contained in the gas to be measured have been removed from the gas the flow rate of the gas is measured. The apparatus for carrying out the method comprises a condensable components/mists removing portion, a gas flow rate measuring portion and a piping means to connect the above two portions, whereby the condensable components/mists removing portion is constituted by a column-like vessel into which the gas is introduced at its lower portion, and the gas has the mists removed by impinging upon the gas deflecting means provided within the vessel, the gas having the condensable components removed by cooling the gas to a temperature close to the atmospheric temperature. The gas thus having the condensable components and mists contained therein removed is fed to the gas flow rate measuring portion through the piping portion to have its flow rate measured by a gas flow meter, in particular by a thermal micro-tube type gas flow meter.

9 Claims, 4 Drawing Sheets

METHOD AND APPARATUS FOR MEASURING FLOW RATE OF A GAS CONTAINING CONDENSABLE COMPONENTS AND MISTS

FIELD OF THE INVENTION

The present invention relates to a method for measuring the flow rate of a gas, and more particularly to a method for measuring of a flow rate of a gas which contains condensable components and oil mists such as blow by gas in an internal combustion engine. The method is in particular adapted to measure the flow rate of a gas which constantly varies such as a blow by gas in an internal combustion engine. The present invention also relates to an apparatus for carrying out that method.

BACKGROUND OF THE INVENTION

Hitherto pistons in automotive gasoline engines, have usually had three piston rings, but in order to improve performance and economy the use of two piston rings has recently become a subject of study and development in various field of the art. On the other hand large displacement diesel engines such as used in buses and trucks are usually used to the limit of their effective life in view of economy. In both cases the volume of gas leaking from the combustion chambers of the cylinders into the crank case, i.e. blow by gas, has become an important social problem. Therefore, in the field of the art concerned, in order to solve the problem an accurate measurement of the flow rate of the blow by gases has become an important task. Such blow by gas principally comprises combustion gas, and includes mists comprising water droplets condensed from vapor, minute droplets of lubricating oil, liquid droplets of unburnt fuel, etc.

Although hitherto it has been publicly known to measure the blow by gas by mainly a wet-type gas meter such a measuring method has various problems.

Here for reference, a typical method for measuring blow by gas using a wet-type gas meter will be explained in reference to FIG. 4 of the attached drawings wherein the principle thereof is shown in a block diagram. The principal elements or substances represented by the reference numerals therein are as follows:

1...Blow By Gas; 2...Oil Trap; 3...Surge Tank; 4...Wet-Type Gas Meter; 5...Liquid Discharge Opening.

In a flow rate measuring apparatus constituted by the above elements, the blow by gas 1 discharged from an engine not shown is first introduced into the oil trap 2 having a box-shaped vessel in which the velocity of the gas 1 is made to be substantially zero so that the mists comprising vapor and oil contained in the gas fall by gravity to be accumulated in the bottom of the oil trap 2. The gas which has the mists therein removed by flowing through the oil trap 2 is then fed to the wet-type gas meter 4 in order to have its velocity measured.

The wet-type gas meter 4 is, however, influenced by variation in pressure of the blow by gas caused by variation in the gas pressure within the engine cylinders owing to a large pressure drop in the gas meter 4, resulting in instability in indications of the meter 4. In order to stabilize those indications the surge tank 3 must have a large volume. However, since the wet-type gas meter 4 is a volumetric flow rate meter, as the flow rate becomes large the pressure losses in the meter becomes large. Therefore, in order to obtain a real flow rate from the indication of the meter it is necessary for the indicated value to be corrected for the temperature and pressure of the gas in the gas meter 4. Moreover, since the wet-type gas meter 4 is an apparatus which measures an accumulated flow rate during a set period of time it cannot carry out measurement following the varying flow rate such as during acceleration or deceleration of the engine. Further the range of measurable flow rate of a wet-type gas meter is narrow. Accordingly, it cannot be used for the purpose of measuring the flow rate of blow by gas of engines of various displacements. In particular, the measurement of blow by gas of diesel engines, most of which have a large displacements, e.g. more than 6,000 cc becomes very inaccurate. For example, in a diesel engine used for a many years, in order to check whether or not the inner surfaces of its cylinders have worn without disassembly it is most suitable to measure the flow rate of blow by gas. However, it is impossible to use a wet-type gas meter for this measurement for the above reasons. Further, a large amount of blow by gas is a problem not to be overlooked from the view point of environmental pollution, etc. and for solving this problem also, accurate measurement of the flow rate of blow by gas is indispensable.

As stated above the measurement of the flow rate of blow by gas, particularly, in large diesel engines, which is directly related to pollution problems cannot be carried out accurately by conventional wet-type gas meters. On the other hand a reliable measurement method therefor to replace the conventional one has not been found to date.

Therefore, it is a principal object of the present invention to provide a method for accurately measuring the flow rate of a gas including condensable components, mists, etc. such as a blow by gas that, in consideration of the fact that hitherto an accurate measurement of the flow rate of a blow by gas of an engine over a broad range and in particular, at the time of acceleration and deceleration has not been possible.

It is another object of the present invention to provide a method for measuring a flow rate of a blow by gas in an engine which can serve to determine whether or not the engine is still serviceable.

It is a still other object of the present invention to provide a method for measuring a flow rate of a blow by gas in an engine which is usable for study of the possibility of decreasing the number of piston rings in an engine e.g. from three to two.

It is a still further object of the present invention to provide a method for measuring a flow rate of a blow by gas in an engine which serves to study to prevent the blow by gas from polluting the environment.

It is a further object of the present invention to provide an apparatus for carrying out the method for measuring a flow rate of a gas or a blow by gas in an engine as stated above.

It is still further object of the present invention to provide an apparatus for measuring a flow rate of a gas or a blow by gas in an engine which contains condensable components and mists, and which apparatus allows a more accurate measurement of the flow rate of the gas by maintaining its pressure within the apparatus substantially constant, because if the gas is subjected to a pressure drop during its passage through the apparatus the gas pressure at the inlet into the apparatus becomes higher than that at its exit, providing not necessarily accurate results.

SUMMARY OF THE INVENTION

In order to achieve the above objects, a method for measuring a flow rate of a gas in accordance with the present invention is provided which comprises the steps of removing mists from a gas such as a blow by gas of an engine which contains condensable components and mists, cooling the gas from which the mists have been removed to a temperature close to the atmospheric temperature so as to condense the condensable components therein, separating the mists of water and oil in a liquid phase from the gas, and measuring the flow rate of the gas from which the mists have been removed to a temperature close to the atmospheric temperature so as to condense the condensable components therein, separating the mists of water and oil in a liquid phase from the gas, and measuring the flow rate of the gas from which the mists and condensable components have thus been removed. In this case, it is also possible to measure the flow rate of the mists contained in the gas such as a blow by gas by measuring the water and oil removed from the gas in a liquid phase during a given period of time.

Further, in accordance with the present invention an apparatus for carrying out the above method is provided which comprises a portion for removing condensable components and mists into which a blow by gas is introduced, a gas flow rate measuring portion, and a piping portion interconnecting the condensable components and mists removing portion and the gas flow rate measuring portion, whereby the condensable components and mists removing portion comprises an upright column-like vessel, the vessel being provided at its lower portion with a horizontal gas inlet to introduce the gas containing condensable components and mists into the vessel, and provided within the vessel at the gas inlet is an inlet mist deflecting means and above the gas inlet an outer mist deflecting means and a mist collecting container, a condenser being mounted above them, and a filter means being mounted near the top of the vessel above the condenser, the vessel being connected above the filter means to an inlet of a pipeline constituting the piping portion interconnecting the condensable components and mists removing portion and the flow rate measuring portion mounted intermediating the pipeline, the gas flow rate measuring portion being provided with a gas flow rate measuring apparatus.

In order to attain one of the objects of the present invention that a gas, in particular, a blow by gas of an engine to be introduced into an apparatus such as described above is not subjected to substantially any pressure drop during its passage through the vessel from the gas inlet to the gas outlet, in accordance with the present invention, an apparatus is provided which comprises a condensable components and mists removing portion into which is introduced a condensable components and mists containing gas, a gas flow rate measuring portion, and a piping portion interconnecting the condensable components and mists removing portion and the gas flow rate measuring portion, whereby the condensable components and mists removing portion comprises an upright column-like vessel which is provided at its lower portion with a horizontal gas inlet through which the condensable components and mists containing gas is introduced into the vessel, and the vessel mounts within it at least two mist removing means spaced apart in the upright direction, a gas cooling means being mounted intermediate the mist removing means, and the vessel is connected at its top end portion to one end of a pipeline constituting the piping portion interconnecting the mist removing portion and the gas flow rate measuring portion, the pipeline mounting at its one portion a thermal micro-tube type gas flow meter constituting the gas flow rate measuring portion, with a blower mounted to the pipeline at its exit end, a pressure difference meter being provided between the gas inlet to the vessel and the outlet of the blower in order to measure differences in pressure of the gas at the gas inlet to the vessel and at the exit of the blower, whereby the drive of the blower is regulated so that the pressure difference measured by the pressure difference meter becomes zero.

From the foregoing it will be appreciated that it is one of the features of the present invention to utilize a thermal micro-tube type gas flow meter as the gas flow rate measuring apparatus which makes it possible to accurately measure the flow rate of the blow by gas which unstably varies at the time of acceleration and deceleration of an engine such as a gasoline engine or diesel engine.

Further, it is also one of the aspects of the present invention that in order to increase the accuracy in flow rate measurement, after the mists contained in the blow by gas have been removed from the gas and the vapor and a part of the condensable components contained in the gas are removed by being cooled by water or air at atmospheric temperature the gas flows through the pipeline which is heat insulated, the flow rate of the gas being measured by the thermal micro-tube type gas flow meter which has a time-constant of about one second and is compensated for the gas temperature.

The present invention also allows the measurement of the flow rate of the mists and condensable components in such a manner that they are cooled to a temperature close to atmospheric at the bottom of the vessel to be accumulated for a given period time and the accumulated quantity is then measured.

BRIEF DESCRIPTION OF THE DRAWINGS

These and other objects and features of the present invention will become more apparent upon studying the following specification in reference to the accompanying drawings in which.

DETAILED DESCRIPTION OF THE INVENTION

Figure 1:
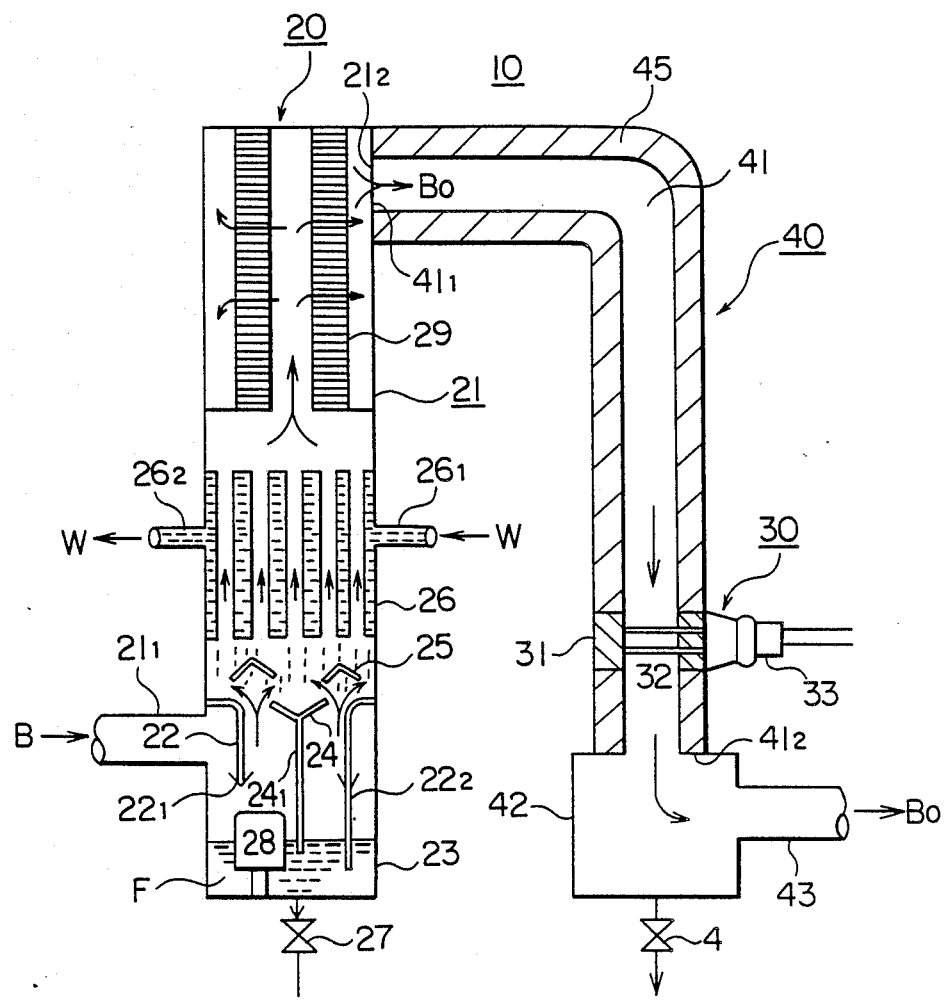
FIG. 1 is a diagrammatical view of the overall arrangement of one embodiment of the present invention.

In FIG. 1 an embodiment of the present invention is diagrammatically illustrated. As apparent from the drawing the apparatus 10 comprises a condensable components and mists removing portion 20 to remove the condensable components and mists contained in a blow by gas a gas, flow rate measuring portion 30 to measure the flow rate of the gas from which the condensable components and mists contained therein have been removed by being passed through the condensable components and mists removing portion 20, and a piping portion 40 connecting the condensable components and mists removing portion 20 and the gas flow rate measuring portion 30 to each other.

The condensable components and mists removing portion 20 comprises an upright column-like vessel 21 which is provided at its lower portion with a blow by gas inlet $21_1$ to introduce therein the blow by gas B. Provided within the vessel 21 so as to confront the blow by gas inlet $21_1$ is an inlet mist deflecting means 22 which has a cylindrical shape with its top end being closed and its bottom being opened so that the blow by gas introduced into the vessel 21 from the blow by gas inlet $21_1$ first impinges upon the outer peripheral cylindrical wall of the inlet mist deflecting means 22 to be deflected downwards, whereby most of the mist contained therein falls along this outer peripheral wall, and is collected in an annular mist collecting trough $22_1$ which is secured horizontally to the lower periphery of the inlet mist deflecting means 22 and has a "V shaped" cross section. The mist thus collected in the trough $22_1$ flows through a condensate-mist drain pipe $22_2$ secured vertically to the bottom of the trough $22_1$ into a liquid phase condensate/mist pool 23 as a liquid phase condensate/mist F.

Provided coaxially within the vessel 21 above the open upper end portion of the upright cylindrical wall of the inlet mist deflecting means 22 is a horizontal conical mist collecting bowl 24 with a "V-shaped" cross section, the outer periphery thereof being spaced apart from the inner wall of the inlet mist deflecting means 22. The bowl 24 is provided at the top of an upright condensate/mist drain pipe $24_1$ provided for the same purpose as that of the condensate-mist pipe $22_2$ secured to the mist collecting trough $22_1$ of the inlet mist deflecting means 22, the condensate collected within the bowl 24 drawing through the pipe $24_1$ into the liquid phase condensate/mist pool 23.

Provided coaxially within the vessel 21 above the annular space formed between the inner peripheral wall of the cylindrical inlet mist deflecting means 22 and the outer periphery of the mist collecting bowl 24 is a horizontal annular inner mist deflecting means 25 having generally an inversed "V shaped" cross section. Thus, the blow by gas B introduced into the vessel 21 from the blow by gas inlet $21_1$ impinges upon the inlet mist deflecting means 22 to be deflected downwards, then reversing by 180° around the lower mist collecting trough $22_1$, to rise upwards along the inner cylindrical wall of the inlet mist deflecting means 22. The blow by gas B then impinges upon the annular inner mist deflecting means 25 so that most of the mist contained therein is caught, falling into the mist collecting trough $22_1$ of the inlet mist deflecting means 22 and the mist collecting bowl 24 to be collected in the liquid phase condensate/mist pool 23.

Further, mounted within the vessel 21 above the inner mist deflecting means 25 is a condenser 26 comprising a number of upright tubes outside which circulates a cooling water W introduced from the cooling-water inlet $26_1$ to be discharged from the cooling-water outlet $26_2$. Thus, the blow by gas B from which almost all of the mists have been removed before the gas reaches the condenser 26 passes through the condenser 26 upwards so that the condensable components which are contained in the gas and which can be condensed at a temperature close to atmospheric temperature are condensed, the condensate thus formed dropping directly into the liquid phase condensate/mist pool 23 at the bottom of the vessel 21, or onto the inner mist deflecting means 25, mist collecting bowl 24, inlet mist deflecting means 22, etc., to be collected in the mist collecting bowl 24 and mist collecting trough $22_1$ of the inlet mist deflecting means 22, and then drained to the liquid phase condensate/mist pool 23 at the bottom of the vessel 21 as the liquid phase condensate/mist F through the liquid condensate/mist drain pipes $24_1$, $22_2$ along with the mist collected within the mist collecting bowl 24, etc. The vessel 21 is provided at its bottom portion with liquid discharge valve 27 to discharge the liquid phase condensate/mist F and also with a liquid high level warning device 28 to control the liquid level of the liquid phase condensate/mist pool 23.

At the upper portion of and coaxial with the inside of the vessel 21 a cylindrical filter means 29 is provided above the condenser 26. This filter means 29 is spaced apart from the inner wall of the vessel 21 so that the blow by gas B passing through the condenser 26 is introduced into the inner cylindrical surface of the filter means 29 to pass through the filtering material and reach the outer cylindrical surface, whereby any micro particles possibly remaining in the blow by gas B are absorbed by the filtering material, the gas then being discharged as a gas Bo from a blow by gas exit $21_2$ provided near the top end of the vessel 21, the condensable components and mists having been removed.

Next the gas flow rate measuring portion 30 comprises a pipe-like body 31 which is adapted to be connected to a part of the pipeline 41 constituting the piping portion 40 and has the same cross section as that of the pipeline 41, the pipe-like body 31 containing within it a thermal micro-tube type gas flow meter 32 horizontally at right angles to the axis of the pipeline 41, the electric output thereof adapted to be taken out through a flow rate electrical output plug 33 mounted to the pipe-like body 31. Incidentally, this thermal micro-tube type gas flow meter 32 was invented by the present inventor and patented as Japanese Patent No. 1,096,114 (Japanese Patent Publication No.56-39427), entitled "A Flow Rate Measuring Apparatus". That is, apparent from the claim of said patent this thermal micro-tube type gas flow meter 32 is characterized in comprising two sealed small metal tubes having the same heat conductivity, one of the tubes being connected to an electrical source, while the other has no electrical current flowing therethrough, the two tubes being arranged in the flow of a gas the flow rate of which is to be measured at right angles to the flow direction, both tubes introducing the mutually connected detecting portions of a thermocouple. In the present invention, a thermal micro-tube type gas flow meter 32 which has a time constant of about one second is used so that it is not sensitive to high frequency variations due to the gas discharge at each cycle of the respective cylinders of an engine, but is sensitive to the variation in the flow rate of the blow by gas B at the time of acceleration or deceleration of the engine.

Finally the piping portion 40 comprises the pipeline 41 connecting the condensable composition and mists removing portion 20 and the gas flow rate measuring portion 30, one end $41_1$ thereof being connected to the blow by gas exit $21_2$ provided near the top portion of the vessel 21 constituting the condensable components and mist removing portion 20, and the midportion of the pipeline 41 is adapted to mount the gas flow rate measuring portion 30. The other end 41₂ of the pipeline 41 downstream of the gas flow rate measuring portion 30 is connected to an exit reservoir 42 to which a blow by gas discharge pipe 43 is connected, a liquid drain valve 44 also being mounted to the reservoir 42. The pipeline 41 is preferably embodied as a heat insulated pipe so that no condensable components, etc., contained in the blow by gas Bo flowing therethrough condense between the filter means 29 mounted to the vessel 21 of the condensable components and mists removing portion 20 and the thermal micro-tube type gas meter 32 of the gas flow rate measuring portion 30. As apparent from the above description, in the apparatus in accordance with the present invention, condensable components and mists are effectively removed from a blow by gas B by first striking against the inlet mist deflecting means 22 provided within the vessel 21 to be deflected downwards, whereby the condensed mist is collected in the mist collecting trough 22₁ mounted below the inlet deflecting means 22. The gas which has most of the mist containing removed is then deflected 180° upwards, to strike upon the inner mist deflecting means 25, the remaining mist in the mist being collected in the mist collecting bowl 24. In this case the mist collected in the mist collecting trough 22₁ and mist collecting bowl 24 accumulate in the liquid phase condensate/mist pool 23 through the condensate/mist drain pipes 22₂ and 24₁, the collected mist then being dischargeable outside the vessel 21 through the liquid discharge valve 27.

Next the remaining gas flows upwards to the condenser 26 mounted above the inner mist deflecting means 25, the condenser 26 being supplied with circulating cooling water W from cooling water inlet 26₁ to be discharged from the cooling water exit 26₂. As the temperature of gas B passing through the condenser 26 is cooled to near atmospheric, condensable components contained therein condense, the condensate being collected within the mist collecting bowl 24 and the trough 22, by way of the inner mist deflecting means 25 mounted below the condenser 26. The condensate is then accumulated in the liquid phase condensate/mist pool 23 through the condensate/mist drain pipes 22₂ and 24₁, the accumulated condensate being discharged out of the vessel 21 through the discharge valve 27, when necessary.

The gas which has been cooled close to atmospheric temperature by the condenser 26 and the condensate had removed is fed to the filter means 29 mounted above the condenser 26, whereby on passing through the filter means 29 any mist which has not fallen at the time of passing through the condenser 26 but rises together with the blow by gas B is forcibly removed.

Only the gas Bo which results with the condensable components and the mists having been essentially perfectly removed from the blow by gas B is supplied to the thermal micro-tube type gas flow meter 32 through the pipeline 41. In this case, in order to avoid having any condensable components, etc. which may still possibly remain in the blow gas Bo condense on the inner wall surface of the pipeline 42 a heat insulating layer 45 is applied to outer wall surface thereof.

The gas Bo from which the mists and the condensable components have thus been removed is fed to the thermal micro-tube type flow meter 32. In this case, by setting the time constant of the meter 32 to about 1 second, the meter 32 will not be sensitive to the high frequency variations caused by the gas discharged every cycle of the respective cylinders of the engine, but it can be sensitive to variations in the flow rate of the blow by gas B during acceleration or deceleration of the engine, to attain the objects of the present invention. The measured value of the thermal micro-tube type flow meter 32 can be taken out as an electrical output through the plug 33 outside the apparatus.

After the flow rate of blow by gas Bo has been measured it is discharged outside the apparatus from the blow by gas discharge pipe 43 through the exit reservoir 42, and the liquid accumulated in the exit reservoir 42 can be drained from the apparatus through the liquid drain valve 44.

On the other hand, the liquid phase condensate/mists F accumulated in the liquid phase condensate/mist pool 23 discharged through the liquid exit valve 17 at set periods of time, and by measuring its volume the flow rate of the liquid condensate and mists F can be also measured. In the liquid phase condensate/mist pool 23 a level rising warning device 28 is provided so as to prevent the liquid from rising too far.

As apparent from the above description, in order to accurately measure the flow rate of a gas introduced into the apparatus in accordance with the present invention, which gas contains condensable components, mists, etc., the mists contained therein are first sufficiently removed and the gas B is then passed through the condenser 26 allowing the thermal micro-tube type gas flow meter 32 to operate at close to atmospheric temperature. The gas passing through condenser 26 is cooled to near atmospheric temperature and simultaneously components which can condense at temperatures close to atmospheric are removed from the gas B, the flow rate of the gas Bo then being measured, making it possible to carry out accurate measurement of the flow rate.

Next some numerical examples of the results of measurements obtained by the present apparatus will be given below:

NUMERICAL EXAMPLES

Measurement of the flow rate of a blow by gas was carried out in a water-cooled, inline two cylinder diesel engine with a displacement of about 1,200 cc, a compression ratio of 20:1, a rated output of 25.5 P.S. at 2,600 rpm, and maximum torque of 70 N m at 2,000 rpm. The engine output was measured with an eddy current type electrical dynamometer.

Figure 2:
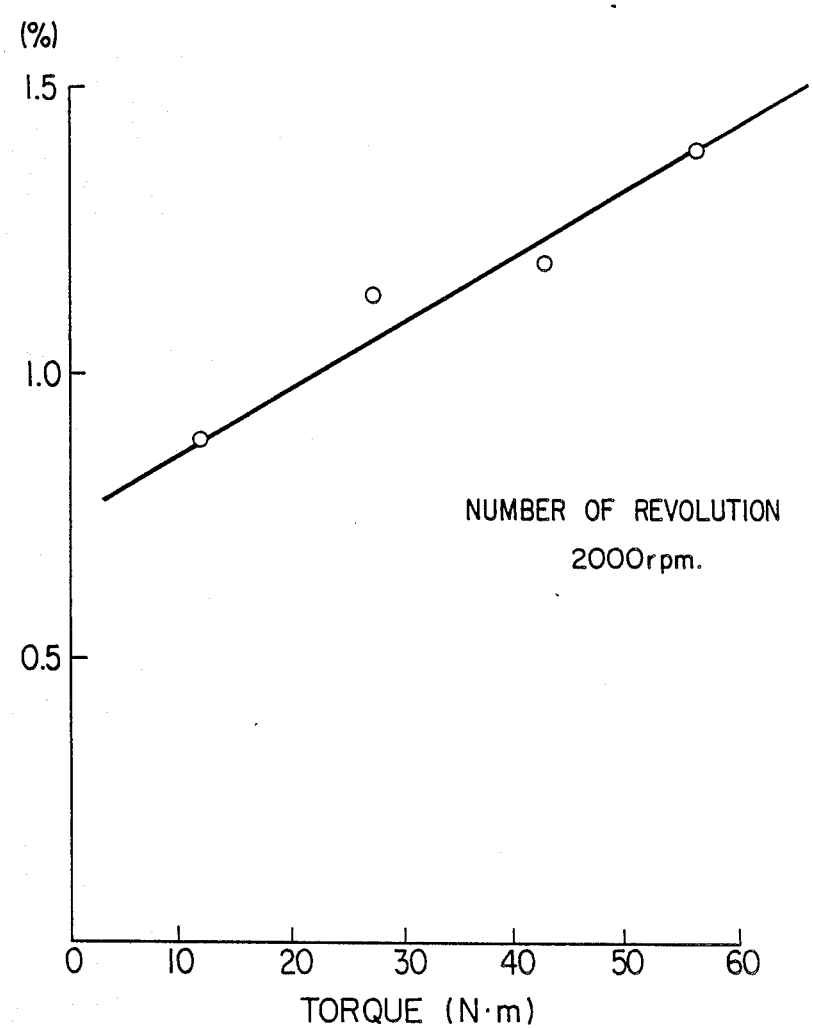
FIG. 2 is an example of diagrams illustrating the relationship between the percentage of blow by gas of a diesel engine to the intake air volume and torque when measured with the apparatus in accordance with the present invention shown in FIG. 1.

The measurement was carried out at a constant 2,000 rpm's with the torque being varied. The results obtained are represented in FIG. 2 with the measured flow rates of the blow by gas expressed by their percentages relative to the volume of intake air versus output torque. As apparent from the diagram, although an increase in torque is caused by the rise of pressure within the cylinders due to an increase in injected fuel, the apparatus indicated that the flow rate of the blow by gas increased as the gas pressure in the cylinders raised. This proves that the results of the measurement by the apparatus in accordance with the present invention are reliable.

In the embodiment previously described in connection with FIG. 1 the blow by gas B introduced into the apparatus is subjected to a pressure drop during the course of its passage through the apparatus as it encounters the various elements included therein, i.e. the pressure of the gas at the gas inlet 21₁ is generally higher than at the gas exit 41₂. This difference in pressure will not necessarily cause serious problems in measuring the flow rate of the gas for practical use. However, the gas pressure at the gas inlet and the gas exit may be equalized if a more accurate measurement of the flow rate of the gas is desired.

Figure 3:
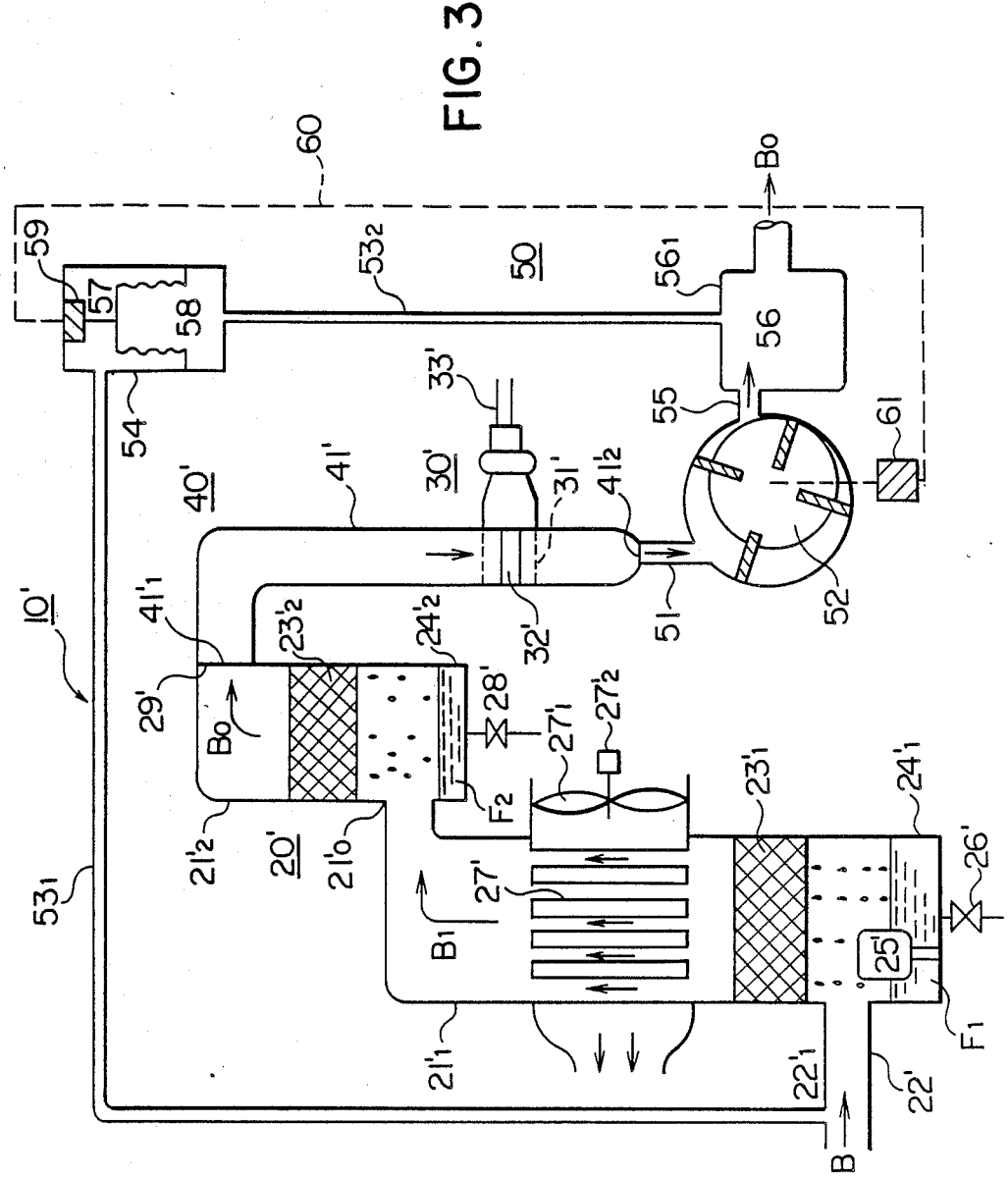
FIG. 3 is a diagrammatical view similar to FIG. 1, but showing another embodiment of the present invention.
Figure 4:
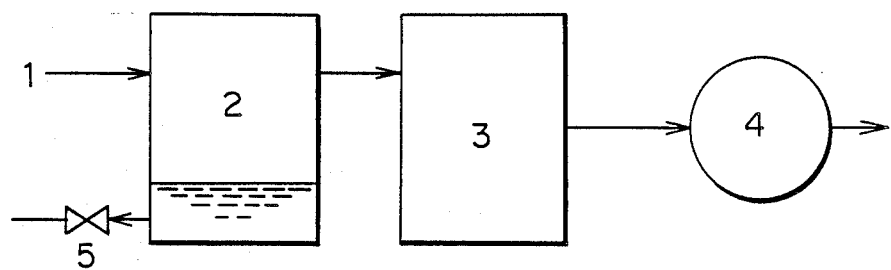
FIG. 4 is a systematic diagram of an example of a typical conventional flow rate meter for measuring blow by gas.

A second embodiment of the present invention which satisfies such a requirement and having a constitution fundamentally similar to that of the first embodiment shown in FIG. 1 will be described below in reference to FIG. 3. As shown in FIG. 3 this comprises a condensable components and mists removing portion 20' to remove the condensable components and mists contained in the gas, a gas flow rate measuring portion 30' to measure the flow rate of the gas having substantially no condensable components and mists as a result of the gas passing through the condensable components and mists removing port 20', and a piping portion 40' to interconnect the condensable components and mists removing portion 20' with the gas flow rate measuring portion 30'.

Among these, the condensable components and mists removing portion 20' comprises an upright column-like main vessel $21'_1$ and a similarly upright column-like sub-vessel $21'_2$ connected near its bottom to an upper port of the main vessel $21'_1$. At the lower part of the main vessel $21'_1$ a blow by gas inlet 22' is provided for introducing the blow by gas B. A first mist removing means 23' is horizontally arranged within the vessel $21'_1$ above the opening of the blow by gas inlet 22' to remove combustion gas, the main component of blow by gas B, as well as lubricating oil and other vapors condensable components etc., this first mist removing means $23'_1$ being constituted by metal meshes having various dimensions and constructions. The blow by gas B thus introduced into the main vessel 21' through the blow by gas inlet 22' has the mists contained therein removed upon passing the first mist removing means $23'_1$, the mists accumulating in a liquid phase condensate/mist pool $24'_1$ formed at the bottom of the vessel $21'_1$ as a liquid phase condensate/mist $F_1$. In the liquid phase condensate/mist pool $24'_1$ a warning means 25' is mounted to issue a warning signal when the level of the liquid phase condensate/mist $F_1$ accumulated therein exceeds a predetermined limit, and a liquid discharge valve 26' is also provided at the bottom of the vessel $22'_1$.

A gas condenser means 27' is provided within the vessel $21'_1$ above the first mist removing means $23'_1$, and comprises a number of mutually spaced upright tubes which serve to cool the gas, after most of the mist has been removed on passing through the first mist removing means $23'_1$, during its passage inside the pipes to a temperature close to atmospheric, the outer peripheries of the pipes are cooled by an air flow from a fan $27'_1$ provided outside of the vessel 21' to be driven by a motor $27'_2$ similarly mounted outside. As a result of this cooling most of the condensable components still contained in the gas are condensed to become a liquid condensate, falling into the liquid phase condensate/mist pool $24'_1$. The remaining gas in which a part of uncondensed mists is contained is guided to the sub-vessel $21'_2$ through a connecting opening $21'_0$ provided between the upper portion of the vessel $22'_1$ and the lower portion of the sub-vessel $21'_2$, the gas being fed to a second mist removing means $23'_2$ horizontally provided in the sub-vessel $21'_2$ above the opening $21'_0$. The uncondensed mist in the gas is thereby caught by the removing means $23'_2$ as liquid mist to accumulate in a liquid phase mist pool $24'_2$ formed at the bottom of the sub-vessel $21'_2$ as a liquid phase mist $F_2$. This liquid phase mist $F_2$ is discharged through a discharge valve 28' mounted to the bottom of the sub-vessel $21'_2$. The construction of the second mist removing means $23'_2$ is substantially similar to that of the first mist removing means $23'_1$.

The gas from which the condensable components and the mists have thus been substantially removed is discharged from a blow by gas exit 29' opened near the upper end of the sub-vessel $21'_2$ as a gas Bo in which substantially no condensable components or mists exist.

The gas flow measuring portion 30' comprises a pipe-like body 31' which has the same cross section as that a of a pipeline 41' constituting the piping portion 40' and is adapted to be connected to a part of the pipeline 41', the pipe-like body 31' horizontally mounting thermal micro-tube gas flow meter 32 as a gas flow rate measuring means at right angles to the axis of the pipeline 41', the electrical output of the meter 32' adapted to be taken out through a flow rate meter electrical output plug 33' mounted to the pipe-like body 31'. The thermal micro-tube type gas flow meter 32' is the same as the one used in the first embodiment and has a time constant of about one second to achieve the same objects as the first embodiment.

Finally the piping portion 40' has a constitution similar to that of 40 in the first embodiment.

In the first embodiment, as shown in FIG. 1 the exit reservoir 42 is connected to the exit end $41_2$ of the pipeline 41 so that the gas Bo, the flow rate of which has been measured, is directly discharged to the atmosphere via the reservoir 42. However, since the mist deflecting means 22 and 25 corresponding to the first and second mist removing means $23'_1$ and $23'_2$, respectively, in accordance with the second embodiment, and the filter means 29 are contained within the vessel 21, the gas pressure drops during its passage through the vessel 21. Therefore, if the gas Bo which has just passed through the thermal micro-tube type gas flow meter 32 is discharged directly from the apparatus 10 as it is the pressure of the blow by gas B at the entrance to the apparatus 10 becomes higher than the pressure of the gas Bo at the exit from the apparatus 10, becomes higher than the pressure of the gas Bo at the exit from the apparatus 10, possibly to affecting the characteristics of the engine and the flow rate of the blow by gas B. This pressure drop or loss may also similarly appear in the apparatus 10' in accordance with the second embodiment as a result of the first and second mist removing means $23'_1$ and $23'_2$, etc.

In view of this, in the second embodiment of the present invention, in addition to a fundamental constitution similar to the first embodiment a pressure compensating means 50 is provided at the exit of the apparatus 10'. That is, as shown in FIG. 3, a blower or vacuum pump 52 is connected through an inlet pipe 51 at the exit end $41'_2$ of the pipeline 41' which constitutes the piping portion 40' downstream of the gas flow rate measuring part 30', and the exit side of the blower 52 is connected to a surge tank 56 through an exit pipe 55. By operating the blower 52 appropriately, gas pressure at the exit pipe 55 or within the surge tank 56 can be raised to the pressure at the blow by gas inlet 22' so that the gas pressure at the exit pipe 55 or the surge tank 56 is made to be the same as the pressure of the gas B at the blow by gas inlet 22'. In order to carry out this control automatically the pressure of the blow by gas B at the time of entrance to the apparatus 10' is sensed through a pressure measuring orifice $22'_1$ formed in the blow by gas inlet 22' to work on a differential pressure meter 54 of any known type through a duct 53₁. At the same time the gas pressure in the surge tank 56 connected to the exit pipe 55 is sensed through a pressure measuring orifice 56₁ formed in the tank 56 to work on the differential pressure meter 54 through a conduit 53₂. Thus, the gas sensed by the pressure measuring orifices 22'₁ and 56₁ through the ducts 53₁ and 53₂, respectively, work only the respective pressure chambers 57 and 58, respectively formed within the meter 54. The pressure difference between both pressures is detected by a pressure transducer 59 belonging to the meter 54. The pressure difference between both pressures is detected by a pressure transducer 59 belonging to the meter 54, the detected signal issued from the transducer 59 being fed to an amplifier 61 through a wire 60, and an output proportional to the signal controls the drive of the blower 52 in such a manner that the pressures within both pressure chambers 57 and 58 are equalized. The blow by gas Bo, the flow rate of which has been measured is discharged from the apparatus 10' through the surge tank 56 as a discharge gas Be.

Thus, it will be appreciated that the second embodiment of the present invention as shown in FIG. 3 operates substantially the same as in the first embodiment shown in FIG. 1. In addition, since in the second embodiment, in order to equalize the pressure of the gas Bo at the exit of the apparatus 10' and the pressure of the gas B at the entrance to the apparatus 10' a blower or a vacuum pump 52 is arranged downstream the thermo micro-tube type gas flow meter 32 and the drive of the blower 52 is regulated so that the gas pressure at the entrance to the apparatus 10' and that at the exit of the thermo micro-tube type gas flow meter 32 are equal, so the measurement of the flow rate of the blow by gas B can be carried out without influencing the operation of the engine.

From the foregoing it will be appriciated that the present invention allows the accurate measurement of a flow rate of a gas such as a blow by gas in which condensable components and mists are contained, the reasons therefor residing in the following:

(1) First, since a thermal micro-tube type gas meter is used as a flow rate measuring meter, the flow rate of a gas such as a blow by gas of an engine which contains condensable components and mists can be accurately measured by utilizing the characteristics of the gas meter that makes it possible to measure a flow rate of a gas accurately and in a wide range of the flow rate;

(2) Second, since the time constant of the thermal micro-tube type gas meter is selected to be about one second it does not respond to the variations in flow rate of the blow by gas from the respective strokes of the cylinders of an engine, but responds accurately to the acceleration or deceleration of the engine, allowing the flow rate of the blow by gas to be measured in various operational conditions of the engine including during variations in engine revolutions;

(3) Third, since the blow by gas has combusted fuel as its main component with condensable components such as water vapor, etc. contained therein, in order to accurately measure the flow rate of the gas the condensable compositions and mists are removed from the gas to obtain a gas proper, its flow rate being accurately measured by the thermal micro-tube type gas meter, the condensable components and mists themselves also accurately measurable.

Finally, at this point, if the effects obtainable from the present invention may be summarized as follows:

Since the apparatus in accordance with the present invention has a constitution as described above and carries out the measurement in a manner as described above and yet the flow rate is measured by the use of a thermal micro-tube type gas flow meter having a time constant of about one second which makes it possible to measure accurately the flow rate of a blow by gas leaking from the combustion chambers of a gasoline engine, diesel engine, etc. into the crank case through the piston rings at the time of operation at a constant number of revolutions and even during variations in revolutions as at the time of acceleration or deceleration. Further, the condensable components and mists contained in the blow by gas which condense up to the atmospheric temperature can also be measured.

In addition, the present apparatus can be utilized to measure leaked gas from the cylinders of a gasoline engine in the case where the number of piston rings mounted to the respective pistons is reduced from three to two, or in a diesel engine used for a period of years the amount of leaked cylinder gas resulting from wear of the cylinders can be measured, serving to determine if the engine can still be operated normally. On the other hand, the blow by gas from an engine usually contains considerable amounts of polluting substances such as oil mists, oil vapors, etc., and in this case, since the flow rate of such polluting substances can be measured by the present apparatus simultaneously with the measurement of the flow rate of the blow by gas the present invention can serve for studying or checking environment pollution by the blow by gas. Thus, the present device contributes to preventing further deterioration in environmental standards.

As will be readily apparent to those skilled in the art, the present invention may be realized in other specific forms without departing from its spirit or essential characteristics. The present embodiments are, therefore, to be considered as illustrative and not restrictive, the scope of the invention being indicated by the claims rather than by the foregoing description, and all changes which come within the meaning and range of equivalents of the claims are therefore intended to be embraced therein.

What is claimed is:

1. A method for measuring a flow rate of a gas in which condensable components; and mist are contained in such as a blow by gas leaking from combustion chambers of cylinders into a crank case in a reciprocating internal combustion engine comprising the steps of: principally removing said mists from said gas; principally removing said condensable components from said gas from which most of said mists have been removed in the previous step, by cooling said gas to a temperature close to atmospheric temperature; and measuring the flow rate of said gas from which substantially all of said mists and said condensable components have been removed by means of a gas flow meter.

2. A method for measuring a flow rate of a gas as claimed in claim 1 wherein said gas flow rate meter is a thermo micro-tube type gas flow meter having a small time constant.

3. A method for measuring a flow rate of a gas as claimed in claim 1 wherein the flow rate of said mists and said condensable components is also measured by measuring the weight of said mists and components removed from said gas during a unit time.

4. An apparatus for measuring a flow rate of a gas in which condensable components, and mist are contained such as blow by gas leaking from combustion chambers of cylinders into a crank case in a reciprocating internal combustion engine comprising:
- a condensable components/mist removing portion into which said gas is introduced to remove said condensable components and said mists;
- a flow rate measuring portion to measure the flow rate of said gas; and
- a piping portion interconnecting said condensable components/mists removing portion with said flow rate measuring portion; whereby:
- said condensable components/mists removing portion comprises an upright tower-like vessel which is provided at its lower portion with a horizontal gas inlet through which said condensable components/mists containing gas is introduced into said vessel, an entrance mist impinging means having a bottom opened cylindrical form with a closed top being mounted within said vessel at said gas inlet, and an inner mist impinging means and a mists collecting means are arranged within said vessel above said entrance mist impinging means, a condenser means being provided within said vessel above said inner mist impinging means and said mist collecting means, and a filtering means provided within said vessel above said condenser means;
- said flow rate measuring portion comprising a flow rate measuring means to measure the flow rate of said gas from which said condensable components and said mists have been removed in said condensable components/mists removing portion; and
- said piping portion comprising a pipeline having an inlet end adapted to be connected to said vessel at an exit of said filter means of said condensable components/mists removing portion, an intermediate portion adapted to be connected to said flow rate measuring means of said gas flow rate measuring portion, and an exit end adapted to be connected to an exit reservoir.

5. An apparatus for measuring a flow rate of a gas as claimed in claim 4 wherein said flow rate measuring means is a thermal micro-tube type gas flow meter.

6. An apparatus for measuring a flow rate of a gas as claimed in claim 5 wherein said thermal micro-tube type gas flow meter has a time constant of about 1 second.

7. An apparatus for measuring a flow rate of a gas as claimed in claim 4 wherein a liquid phase condensate/mists pool is provided at the bottom of said vessel constituting said condensable components/mists removing portion, a liquid discharge valve being connected to said vessel at its bottom in communication with said liquid phase condensate/mists pool.

8. An apparatus for measuring a flow rate of a gas as claimed in claim 4 wherein said pipeline of said piping portion is heat insulated.

9. An apparatus for measuring a flow rate of a gas as claimed in claim 4 wherein a blower means is provided at the end of said pipeline, a differential pressure meter being provided at the exit of said blower means to measure a difference in gas pressure between gas pressure at the entrance to said vessel and gas pressure at an exit of said blower, the drive of said blower means being controlled by said differential pressure meter so that said difference in gas pressure does not substantially occur.

* * * * *